United States Patent
Joyner

(10) Patent No.: US 9,445,691 B1
(45) Date of Patent: Sep. 20, 2016

(54) UTENSILS WITH ELEVATED ENDS FOR PREVENTING CONTAMINATION

(75) Inventor: Michael Joyner, Delray Beach, FL (US)

(73) Assignee: Bly Management Limited Partnership, Boca Raton, FL (US)

( * ) Notice: Subject to any disclaimer, the term of this patent is extended or adjusted under 35 U.S.C. 154(b) by 0 days.

(21) Appl. No.: 13/457,989

(22) Filed: Apr. 27, 2012

Related U.S. Application Data

(63) Continuation of application No. 13/423,835, filed on Mar. 19, 2012, now Pat. No. 8,769,832.

(60) Provisional application No. 61/454,267, filed on Mar. 18, 2011.

(51) Int. Cl.
*A47J 43/28* (2006.01)

(52) U.S. Cl.
CPC .......... *A47J 43/28* (2013.01); *A47G 2400/025* (2013.01)

(58) Field of Classification Search
CPC .... A47J 43/28; A47G 21/02; A47G 2400/25
USPC ........ D7/652, 653; 30/322, 323, 324, 298.4; 29/888.09
See application file for complete search history.

(56) References Cited

U.S. PATENT DOCUMENTS

| | | | |
|---|---|---|---|
| 116,412 A * | 6/1871 | Chapman | B26B 3/00 30/298.4 |
| 260,157 A * | 6/1882 | Brower | B26B 3/00 30/298.4 |
| 721,249 A * | 2/1903 | Stimson | A47G 21/02 30/322 |
| 868,583 A | 10/1907 | Schuyler | |
| 1,128,190 A * | 2/1915 | Routerly | 30/327 |
| 1,133,026 A * | 3/1915 | Heidelberg | A47G 21/02 30/327 |
| 1,347,307 A * | 7/1920 | Thomas | A47G 21/02 30/1 |
| 1,496,415 A * | 6/1924 | Hobson | B21D 53/64 30/342 |
| 1,962,279 A * | 6/1934 | Lott | B21D 53/62 72/339 |
| 2,070,034 A * | 2/1937 | Warren | B44C 3/085 30/324 |
| 2,099,430 A * | 11/1937 | Quea | B67B 7/44 241/DIG. 17 |
| 2,165,045 A * | 7/1939 | May | A61J 7/0023 30/327 |
| 2,340,561 A * | 2/1944 | Renfro | 312/42 |
| 2,409,925 A * | 10/1946 | Bloom | 312/240 |
| 2,439,882 A * | 4/1948 | Beddow | A47G 21/06 30/147 |

(Continued)

OTHER PUBLICATIONS http://www.amazon.com/Sassy-Less-Training-Spoon-Colors/dp/B002TOKHKS/ref=sr_1_14?ie=UTF8&s=baby-products&qid=1287603495&sr=1-14.

*Primary Examiner* — Sean Michalski
(74) *Attorney, Agent, or Firm* — H. John Rizvi; Gold & Rizvi, P.A.

(57) ABSTRACT

The present invention relates to eating utensils, such as spoons, forks and knifes that include a riser configured to elevate the distal end of the utensil when the utensil is placed in an upright or inverted position on a planar surface to avoid contamination. The riser includes a riser member having a lower curvature end integrally formed with a handle and an upper curvature end integrally formed with the working end of a spoon, fork or knife A plurality of eating utensils can be stacked one on top of the other for storage or packaging.

18 Claims, 7 Drawing Sheets

(56) References Cited

U.S. PATENT DOCUMENTS

| | | | | |
|---|---|---|---|---|
| 2,493,128 | A * | 1/1950 | Everett | G03D 15/006 30/164.9 |
| 2,576,388 | A * | 11/1951 | Claflin | A61J 7/0023 16/430 |
| 2,752,678 | A * | 7/1956 | Welch | A47G 21/04 206/499 |
| 2,789,349 | A * | 4/1957 | Lee | B26B 3/02 30/295 |
| 2,824,369 | A * | 2/1958 | Welch | A47G 21/04 206/499 |
| 2,853,780 | A * | 9/1958 | Bull | A47J 43/281 30/295 |
| 3,008,358 | A * | 11/1961 | Dunn | 72/376 |
| 3,064,352 | A * | 11/1962 | Koe | A61B 17/3211 30/298.4 |
| 3,217,635 | A * | 11/1965 | Scavullo | A47J 43/283 16/422 |
| 3,409,059 | A * | 11/1968 | Gorton, Jr. | A47J 19/022 30/123 |
| 3,436,111 | A * | 4/1969 | England | 294/49 |
| 3,595,104 | A * | 7/1971 | Cooper | B26B 3/06 76/104.1 |
| D245,141 | S * | 7/1977 | Eldridge | B26B 3/06 D7/662 |
| 4,283,808 | A * | 8/1981 | Beebe | A46B 5/02 15/145 |
| 4,389,777 | A * | 6/1983 | Landsberger | B25G 1/10 30/324 |
| 4,599,797 | A | 7/1986 | Bax | |
| 4,834,328 | A | 5/1989 | Hall | |
| 4,914,819 | A * | 4/1990 | Ash | A47G 21/02 30/141 |
| D312,749 | S * | 12/1990 | Kessler | B26B 3/06 D7/395 |
| 4,984,367 | A * | 1/1991 | Albanese | A47G 21/02 30/147 |
| 5,058,279 | A | 10/1991 | Mars | |
| 5,060,386 | A | 10/1991 | Mars | |
| 5,068,967 | A | 12/1991 | Mars | |
| 5,243,763 | A * | 9/1993 | Persson | B26B 3/00 30/298.4 |
| 5,332,106 | A | 7/1994 | Schlotte et al. | |
| 5,376,325 | A * | 12/1994 | Ormson | B29C 45/1671 264/254 |
| D362,790 | S | 10/1995 | O'Connor et al. | |
| 5,479,708 | A | 1/1996 | Thomas | |
| 5,481,805 | A * | 1/1996 | Wilson | B25G 1/102 30/322 |
| D368,833 | S | 4/1996 | Gibson et al. | |
| 5,590,472 | A * | 1/1997 | Yaakov | A47G 21/02 30/298.4 |
| 5,592,744 | A | 1/1997 | Weinstein | |
| 5,603,163 | A | 2/1997 | Ikner, Jr. | |
| 5,630,276 | A * | 5/1997 | Weinstein | A47G 21/02 30/324 |
| 5,678,790 | A | 10/1997 | Dwyer | |
| 5,709,423 | A | 1/1998 | Romero | |
| 5,860,190 | A | 1/1999 | Cano | |
| 5,890,223 | A * | 4/1999 | Klemmer | A47G 21/02 30/150 |
| 6,027,151 | A | 2/2000 | McNab et al. | |
| 6,049,936 | A | 4/2000 | Holley | |
| 6,145,204 | A * | 11/2000 | Cash | 30/322 |
| 6,199,245 | B1 * | 3/2001 | Blessing | 16/430 |
| D440,116 | S | 4/2001 | Levie | |
| D455,618 | S * | 4/2002 | Richardson | D7/692 |
| 6,363,568 | B1 | 4/2002 | Harrison et al. | |
| 6,490,760 | B1 * | 12/2002 | Lauer | A46B 5/00 16/110.1 |
| D486,265 | S * | 2/2004 | Olsen | B26B 3/06 D28/38 |
| 6,698,065 | B2 * | 3/2004 | Lauer | A46B 5/00 16/110.1 |
| 6,848,339 | B2 * | 2/2005 | Hakim | A47G 21/02 30/324 |
| D523,299 | S * | 6/2006 | Johnson | D7/653 |
| D530,978 | S * | 10/2006 | Lo | B26B 3/06 D7/401.2 |
| D531,827 | S * | 11/2006 | Jelmoni et al. | D6/358 |
| D573,852 | S * | 7/2008 | Wills | B26B 3/06 D7/663 |
| D585,246 | S * | 1/2009 | Miller | B26B 3/06 D7/653 |
| D595,546 | S * | 7/2009 | LeGreve | B26B 3/06 D7/691 |
| 7,574,776 | B2 * | 8/2009 | Lawless | B25B 33/00 16/110.1 |
| 7,856,910 | B2 * | 12/2010 | Kwok | B26B 3/00 16/111.1 |
| D649,398 | S * | 11/2011 | Greiner | D7/401.2 |
| D652,252 | S * | 1/2012 | Greiner | B26B 3/06 D7/401.2 |
| D653,500 | S * | 2/2012 | Greiner | D7/401.2 |
| 8,409,231 | B2 * | 4/2013 | Dunn | A61B 17/3213 30/329 |
| 8,769,832 | B1 * | 7/2014 | Joyner | A47J 43/28 30/322 |
| 2002/0144410 | A1 * | 10/2002 | Hufnagel | B25G 3/36 30/344 |
| 2003/0110644 | A1 * | 6/2003 | Miller | A47G 21/02 30/322 |
| 2004/0200075 | A1 * | 10/2004 | Wedderburn | A47G 21/02 30/129 |
| 2005/0155229 | A1 * | 7/2005 | Lee | A47G 21/06 30/322 |
| 2005/0190647 | A1 | 9/2005 | Rosati | |
| 2005/0214415 | A1 * | 9/2005 | Craig | A47J 43/281 426/94 |
| 2007/0039192 | A1 * | 2/2007 | Benson | A47G 21/00 30/296.1 |
| 2007/0084063 | A1 | 4/2007 | Hughes | |
| 2007/0214650 | A1 * | 9/2007 | Tomazini | A47G 21/02 30/142 |
| 2011/0192038 | A1 * | 8/2011 | Moon | A47G 21/02 30/340 |
| 2013/0133206 | A1 * | 5/2013 | Donovan | A47G 21/02 30/298.4 |
| 2013/0133207 | A1 * | 5/2013 | Donovan | A47G 21/02 30/298.4 |
| 2014/0373862 | A1 * | 12/2014 | Prokop, III | A45D 24/14 132/150 |
| 2015/0230640 | A1 * | 8/2015 | Brady | A47G 21/023 30/322 |

* cited by examiner

UTENSILS WITH ELEVATED ENDS FOR PREVENTING CONTAMINATION

CROSS-REFERENCE TO RELATED APPLICATION

This application claims the benefit of U.S. Non-Provisional patent application Ser. No. 13/423,835, filed on Mar. 19, 2012, which claims the benefit of U.S. Provisional Patent Application Ser. No. 61/454,267 filed Mar. 18, 2011, which is incorporated herein in its entirety.

FIELD OF THE INVENTION

The present invention relates generally to utensils. More particularly, the present disclosure relates to eating utensils including a riser integrally formed with the body of the utensil and configured to elevate the working end of the utensil above a planar surface to avoid contaminating the end with germs and bacteria.

BACKGROUND OF THE INVENTION

Prior art is congested with various renditions of eating utensils including spoons, forks and knifes. Eating utensils are designed for the purpose of effectively manipulating food or liquids by holding food in place, lifting food to the mouth, stirring liquids or cutting foods. Conventionally, eating utensils include an elongated handle integrally formed with a distal working end comprising any one of a plurality of tines for defining a fork, a small shallow bowl defining a spoon, or an extending blade for defining a knife. The utensils are typically fabricated from a rust-resistant metal such as stainless steel. Eating utensils are characterized as having a variety of different dimensions, shapes and sizes. For example, forks include a number of large or small sized tines that form a dinner fork, a salad fork, or a desert fork. Knifes often include a dull edge blade for use as a butter knife, or a blade having a plurality of sharp ridges generally used for carving. The concave shallow bowl associated with spoons can also be larger or smaller in size resulting in different spoons such as a baby spoon, an adult spoon, or a soup spoon. In general, eating utensils are categorically selected to assist individuals in a variety of different food or drink related activities.

A large majority of prior art eating utensils are focused on improving the handle section of the instrument. For example, many utensils have been designed to provide enlarged handles, handles including friction-enhancing features such as dimples or indentations, and handles including a foam or cushion to provide comfort during use. Other special need utensils have also been designed to address a number of challenges facing the elderly or children having limited manual dexterity. For example, self-leveling spoons have been implemented to allow individuals to feed themselves without spilling food. Some utensils include tethers or straps that are removeably attached to the wrist of the user to prevent the utensil from falling to the floor.

Though the newly constructed prior art eating utensils help accommodate a variety of different needs, and assist individuals in better handling the utensils during use, such instruments fail to provide a hygienic solution in reducing and preventing germs from contaminating the working end of the utensil. For example, when handling eating utensils, adults often place the utensils on a planar surface such as a dinner table, in a sink, within a plate, or simply store the utensils in a drawer when not in use. As traditional prior art eating utensils are placed on the planar surface, the distal working end of the utensil generally comes in contact with the surface. As the utensil is placed on the table, in a plate, or in a drawer, the working end of the fork, spoon, or knife is exposed to contamination by germs and bacteria. Many surfaces are dirty, and include contaminants, germs and bacteria if not washed regularly. As a result, a contaminated eating utensil can pose a health risk to both infants and adults alike. Typically, eating utensils are simply transferred from a drawer to a table setting in preparation for eating. The user grasps the eating utensil lying flat on the table and proceeds to eat with the use of the utensil.

Efforts have been implemented to reduce contamination of eating utensils. Some prior art devices having incorporated lifters that are separately attached to the body of the eating utensils to help elevate the utensil. In some exemplary embodiments, lifters comprise round or rectangular members having an aperture for receiving a utensil. Other lifters include base members for simply resting the utensils thereon. The use of such lifters presents certain drawbacks. For example, prior art lifters provide an additional piece that must be separately attached to and detached from each individual utensil before and after use, the lifters are often misplaced when separated from the utensil, and assembling the lifters to the utensils can be time consuming.

Though conventional prior art has addressed some issues related to traditional eating utensils, there remains a need for an eating utensil that is safe and easy to use, is configured to elevate the distal working end of the utensil to avoid contamination when the utensil is disposed on a planar surface, and provides utensils that can be stacked one on top of the other for storage and packaging.

SUMMARY OF THE INVENTION

A first aspect of the present invention provides an eating utensil comprising a handle, a working end, a riser extending upwards, at an angle, from the handle and terminating along a peripheral edge of the working end, where the handle, the riser and the working end are formed as one integral piece, and wherein the riser is configured to elevate the working end above a planar surface a predetermined distance when the utensil is placed in an upright position on a planar surface. The riser includes a riser member having a lower curvature end integrally formed with the handle and an upper curvature end integrally formed with the working end. The length of the riser member is selected to define the predetermined distance.

The eating utensil includes any one of a bowl to form a spoon, a plurality of tines that form a fork, and a blade that forms a knife. The handle of the spoon and the fork includes a curvature that defines a gap between the handle of the spoon and the fork and the planar surface when the spoon and the fork are placed in an upright position on the surface. The lower curvature end of the riser of the knife defines another gap formed between the handle of the knife and the planar surface when the knife is placed in an upright position on the surface. The upper curvature end of the riser is configured to elevate the working end above the planar surface when the eating utensil is placed in an inverted position on the surface.

A second aspect of the invention provides flatware for manipulating food and drink, where the flatware comprises an elongated body forming a handle, a riser, and a distal operating end, where the riser is curved upwardly, at an angle, from the handle and terminates along a peripheral edge of the distal operating end, and wherein the riser is configured to elevate the distal operating end above a planar surface a predetermined distance when the flatware is placed in an upright position on a planar surface.

In yet another aspect, the present invention provides a method of manufacturing eating utensils, said method comprising the steps of integrally constructing from plastic, wood, or metal, an eating utensil comprising a handle, a working end, a riser extending upwards, at an angle, from the handle and terminating along a peripheral edge of the working end, and wherein the riser elevates the working end above a planar surface a predetermined distance when the eating utensil is placed in an upright position on a planar surface.

In yet another aspect, the method of manufacturing eating utensils includes the step of storing or packaging a plurality of eating utensils by stacking the plurality of eating utensils one on top of the other.

These and other advantages of the invention will be further understood and appreciated by those skilled in the art by reference to the following written specifications, claims and appended drawings.

BRIEF DESCRIPTION OF THE DRAWINGS

The invention will now be described, by way of example, with reference to the accompanying drawings, in which.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in the perspective view of FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Eating utensils 10, 20 and 30 are shown throughout FIGS. 1-13 as representing a spoon, a fork and a knife, respectively. Such utensils are provided for illustrative purposes only and are not intended to be a limitation on the spirit and scope of the present invention. It is contemplated that other utensils, tools, objects or instruments can be modified to incorporate the functional features of the present invention. Exemplary forms of other utensils may include cooking utensils such as ladles, spatulas, strainers, whisks, stirrers, tongs, turners, spoodles, cooking spoons, scrapers, and cooking forks; hygienic utensils such as toothbrushes, combs, brushes, curling irons, hair dryers, toothpicks and scrubbers; laboratory utensils that include any of stirrers, pipettes, syringes, laboratory tools, or any other tool or instrument having a distal functional or operative member attached to a handle, where an individual wishes to avoid contaminating the distal working end when resting the utensil, object, tool or instrument on a planar surface.

Figure 1:
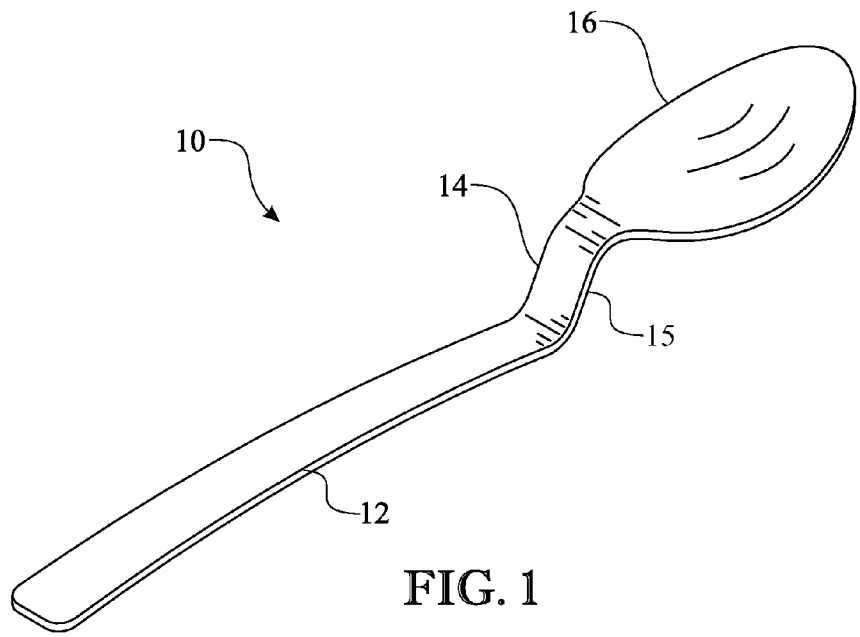
FIG. 1 is a perspective view of an eating utensil including a spoon, in accordance with one embodiment of the present invention.

Referring now to the drawings wherein like elements are represented by like numerals throughout, there is shown in FIG. 1 a perspective view of an eating utensil 10, in accordance with one embodiment of the present invention. Eating utensil 10 comprises a handle 12, a riser 14, and a small concave bowl 16 all integrally formed to define a spoon 10. The length and width of the handle 12, and the size and depth of the concave bowl 16 are selectively dimensioned to provide a spoon 10 that can be used in a variety of different food or drink related activities. For example, handle 12 may be short or long depending on the type of spoon 10 desired. In one exemplary embodiment, concave bowl 16 may comprise a shallow configuration designed to hold a small amount of food or include a greater depth to hold a larger amount of food. Spoon 16 can be dimensionally constructed to provide a tea spoon, a soup spoon, a basting spoon, etc. . . . .

Riser 14 comprises a generally S-shaped configuration having a riser member 15 including a lower curvature end integrally formed with handle 12, and an upper curvature end integrally formed with bowl 16. Riser member 15 extends upwards from the end of handle 12, at an angle, and terminates along the peripheral edge of bowl 16. Riser member 15 is preferably the same width as that of handle 12 and dimensionally structured to withstand flexing or downward forces exerted on bowl 16. Thus, spoon 10 can be effectively used to stir liquids having differing viscosities, or to manipulate food without compromising the structural integrity of riser 14.

Figure 2:
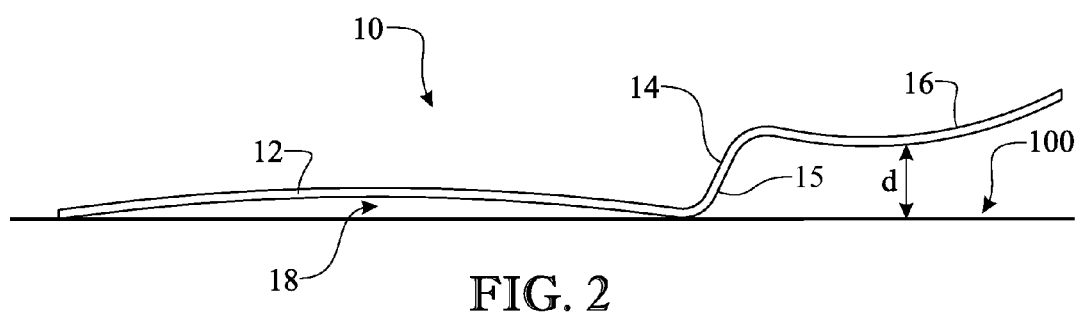
FIGS. 2 and 3 are side views of the eating utensil of FIG. 1, showing the eating utensil placed in an upright and inverted position, respectively, on a planar surface with the concave bowl end elevated above the surface.

FIG. 2 shows a side view of spoon 10 placed in an upright position on a planar surface 100. Handle 12 includes a curvature with the end of the handle 12 and the lower curvature of the riser 14 engaging planar surface 100. The curvature of the handle 12 provides a gap 18 for a person to easily grasp the handle 12 with a finger and thumb without difficulty. Most eating utensils include a handle that lays completely flat on a planar surface making it difficult for a person to pick-up. The present invention resolves this issue by providing a gap 18 that allows a user to easily pick-up the utensil 10 from a table or plate.

As better illustrated in FIG. 2, the length of riser member 15 is selected to elevate bowl 16 of the spoon 10 above a planar surface a predetermined distance, denoted at d, to prevent the concave bowl 16 from coming into contact with a potentially contaminated surface 100. The constructive features of spoon 10 provide a center of gravity that is shifted along handle 12. This feature allows the spoon 10 to be placed on a planar surface 100 with the concave bowl 16 elevated. As seen in FIG. 2, the length of riser member 15 correlates to the distance d in which the bowl 16 is elevated above surface 100. Thus, the longer the riser member 15 the greater the distance d.

Figure 3:
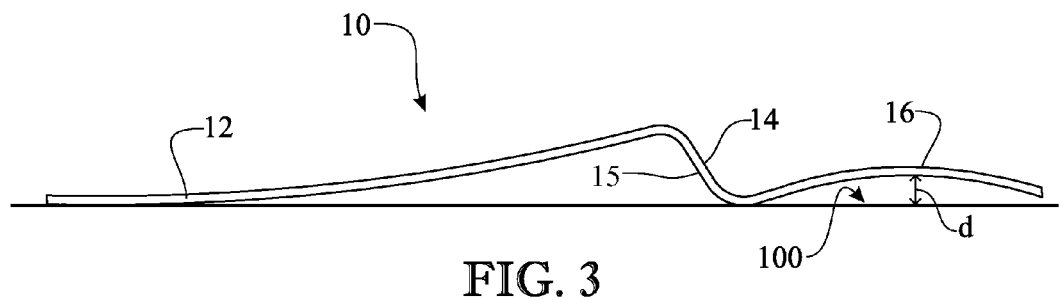

FIG. 3 shows a side view of the spoon 10 of FIG. 1, oriented in an inverted position on a planar surface 100. The upper curvature end of riser 14 engages with surface 100 elevating the concave bowl 16 above the surface 100 a distance d. As such, the spoon 10 of the present invention includes a riser 14 that effectively elevates the concave bowl 16 of a spoon 10 above a surface 100 when the spoon 10 is placed in either an upright position or inverted position. This optimum feature prevents the working end of the spoon 10 from being contaminated with germs or bacteria that may be lingering on the surface 100.

Figure 4:
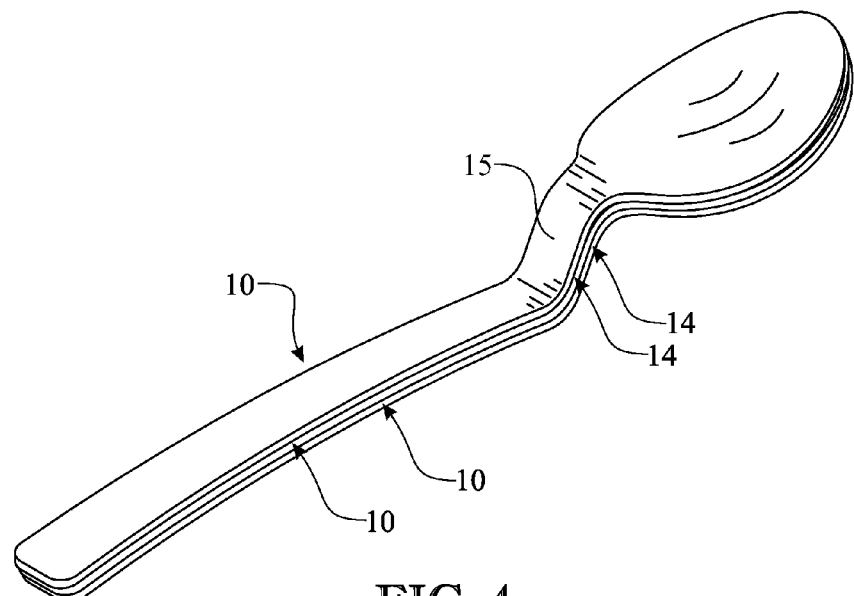
FIG. 4 is a perspective view of the eating utensil of FIG. 1, shown stacked one on top of the other.

FIG. 4 shows a perspective view of a plurality of spoons 10 stacked one on top of the other, in accordance with the present invention. As seen, the lower surface of the handle 12, the lower surface of riser 14 and the convex contour of bowl 16, of one spoon 10 engages the upper surface of the handle 12, the upper surface of riser 14, and the concave contour of a second spoon 10. Thus, the spoon 10 of the present invention is structurally constructed to be stacked one on top of another. This feature offers a benefit for storing and packaging a plurality of spoons 10.

Figure 5:
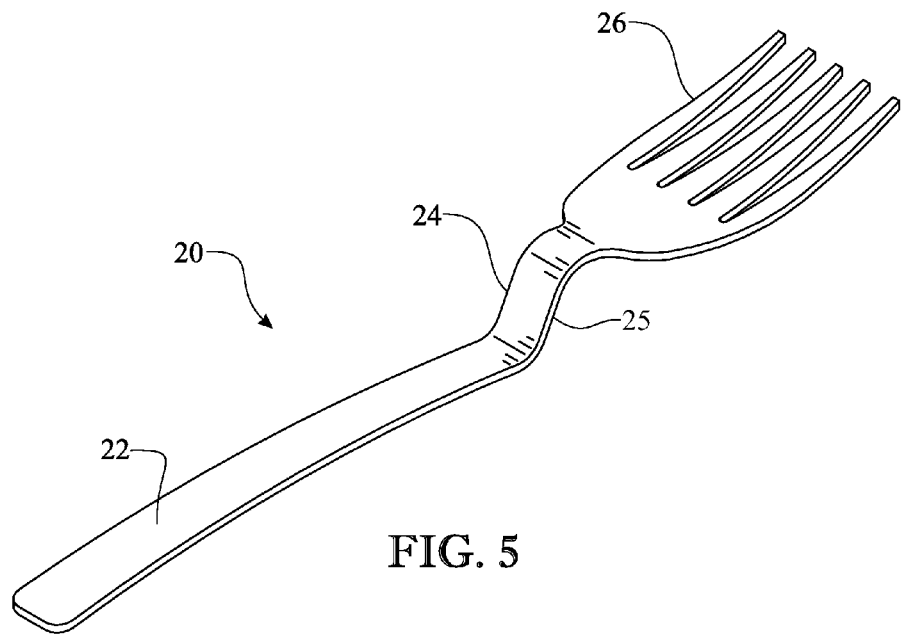
FIG. 5 is a perspective view of an eating utensil including a fork, in accordance with another embodiment of the present invention.

Turning now to FIG. 5 there is shown a perspective view of an eating utensil 20, in accordance with another embodiment of the present invention. Eating utensil 20 comprises a handle 22, a riser 24, and a plurality of tines 26 all integrally formed to define a fork 20. The number and size of the plurality of tines 26 are selectively dimensioned to provide a fork 20 for use in a variety of different food related activities. For example, the number and size of the plurality of tines 26 are selected to provide for different forks that may include a dinner fork, a salad fork, a desert fork, etc. . . . . .

Riser 24 includes a riser member 25 including a lower curvature end integrally formed with handle 22, and an upper curvature end integrally formed with the plurality of tines 26. The riser member 25 extends upwards from the end of handle 22, at an angle, and terminates about the plurality of tines 26. Riser member 25 is preferably the same width as that of handle 22 and dimensionally structured to withstand downward forces exerted on the plurality of tines 26. Thus, fork 20 can be effectively used to manipulate food without compromising the structural integrity of riser 24.

Figure 6:
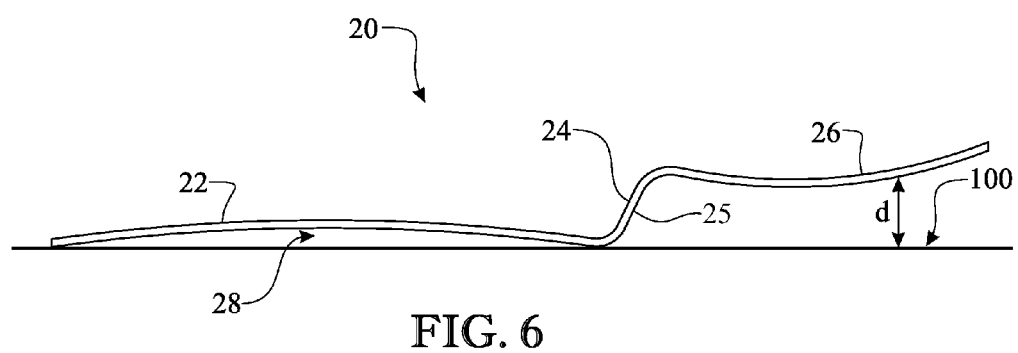
FIGS. 6 and 7 are side views of the eating utensil of FIG. 5, showing the eating utensil placed in an upright and inverted position, respectively, on a planar surface with the plurality of tines elevated above the surface.

With reference to FIG. 6, there is shown a side view of a fork 20 placed in an upright position on a planar surface 100. Handle 22 includes a curvature where one end of the handle 22 and the lower curvature end of the riser 24 both engage the planar surface 100. The curvature of handle 22 defines a gap 28 for a person to easily grasp the handle 22 with a finger and thumb without difficulty.

The length of riser member 25 is selected to elevate the plurality of tines 26 above a planar surface 100 a predetermined distance, denoted at d, to prevent the tines 26 from coming into contact with a potentially contaminated surface 100. As seen in FIG. 6, the length of riser member 25 correlates to the distance d in which the tines 26 are elevated above surface 100.

Figure 7:
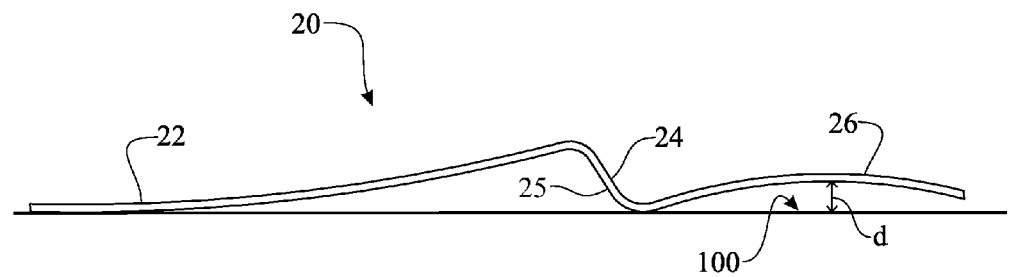

FIG. 7 shows a side view of the fork 20 of FIG. 5, oriented in an inverted position on a planar surface 100. As seen, the upper curvature end of riser 24 engages with surface 100 to elevate the plurality of tines 26 above surface 100 a distance d. As with the spoon 10, the fork 20 of the present invention includes a riser 24 that effectively elevates the plurality of tines 26 above a surface 100 when the fork 20 is placed in an upright position or inverted position on a surface 100 such as a table.

Figure 8:
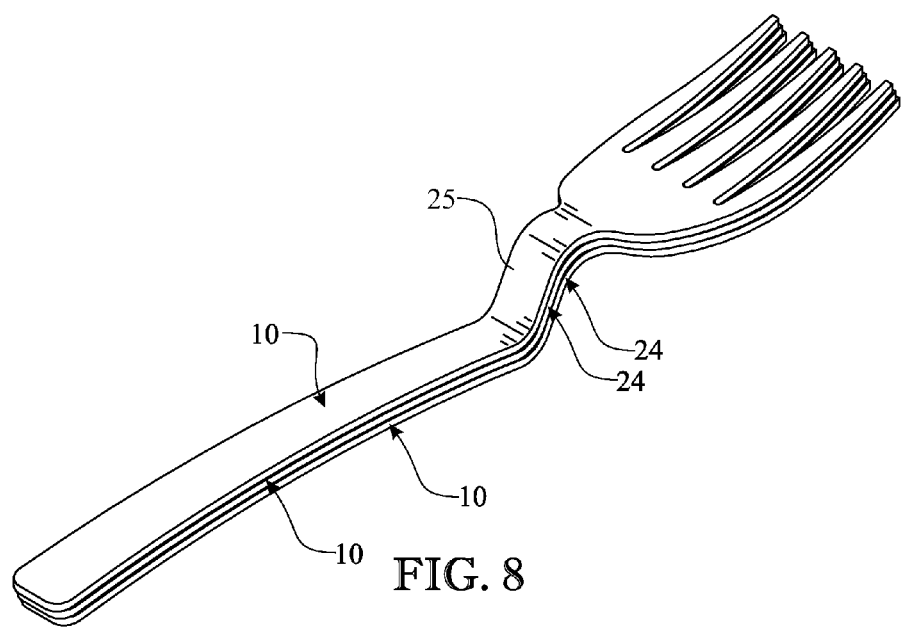
FIG. 8 is a perspective view of the eating utensil of FIG. 5, shown stacked one on top of the other.

Turning to FIG. 8 there is shown a perspective view of a plurality of forks 20 stacked one on top of the other, in accordance with the present invention. The lower surface of the handle 22, the riser 24 and the plurality of tines 26 of one fork 20 engages the upper surface of the handle 22, the riser 24, and the plurality of tines 26 of a second fork 20. This benefit allows for a plurality of forks 20 to be easily stored or packaged for retail. Stacking forks 20 one on top of the other requires little space, and reduces the amount of packaging required.

Figure 9:
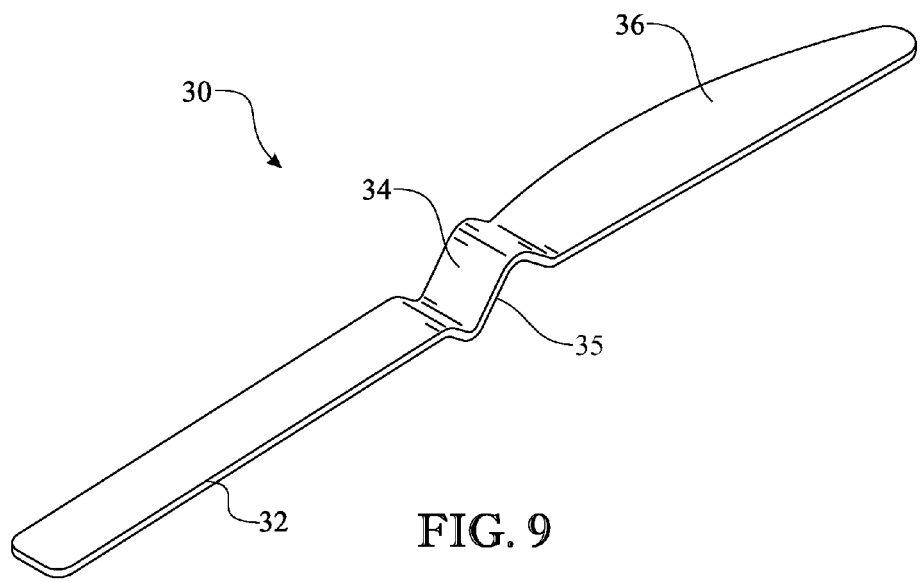
FIG. 9 is a perspective view of an eating utensil including a knife, in accordance with yet another embodiment of the present invention.

FIG. 9 shows a perspective view of an eating utensil 30, in accordance with another embodiment of the present invention. Eating utensil 30 includes a handle 32, a riser 34, and a blade 36 all integrally formed together to define a knife 30. Blade 36 can be constructively dimensioned to provide for a butter knife, a steak knife, a carving knife, etc. . . . . .

Riser 34 comprises a generally S-shaped configuration having a riser member 35 including a first curvature end integrally formed with handle 32, and a second curvature integrally end integrally formed with blade 36. Riser member 35 extends upwards from handle 32, at an angle, elevating blade 36 above surface 100. Riser member 35 is preferably the same width as that of handle 32 and dimensionally structured to withstand flexing forces exerted on blade 36.

Figure 10:
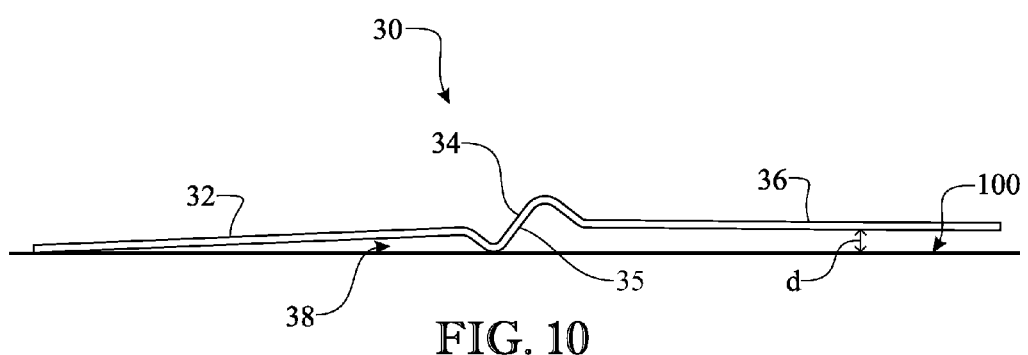
FIGS. 10 and 11 are side views of the eating utensil of FIG. 9, showing the eating utensil placed in an upright and inverted position, respectively, on a planar surface with the blade elevated above the surface.

With reference to FIG. 10, there is shown a side view of a knife 30 placed in an upright position on a planar surface 100. With knife 30 resting on surface 100, the first curvature end of riser 34 engages surface 100 to lift the handle 32 to form a gap 38. The gap 38 allows a user to easily pick-up the knife 30 from the surface 100 such as a table or plate. The first curvature end of the riser 34 also elevates the blade 36 above the surface 100 a distance d to prevent the blade 36 from coming into contact with potentially contaminated surface 100. As seen, the amount of curvature defining the first curvature end and second curvature end along with the length of riser member 35 all correlate to define the size of the gap 38 and the elevational distance d provided between the surface 100 and blade 36.

Figure 11:
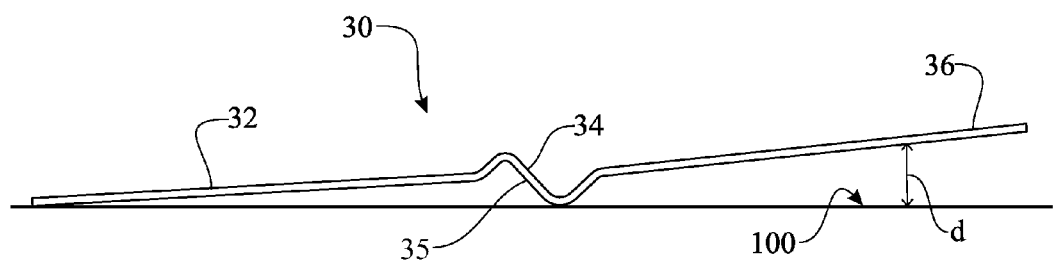

FIG. 11 shows a side view of the knife 30 placed in an inverted position on a planar surface 100. In this configuration, the second curvature end rests on surface 100 to elevate both, the handle 32 and the blade 36. As such, knife 30 of the present invention includes a riser 34 that effectively elevates the handle 32 and the blade 36 above a surface 100 when the knife 30 is placed in either an upright or inverted position. This feature prevents the blade 36 from being contaminated with germs or bacteria residing on surface 100.

Figure 12:
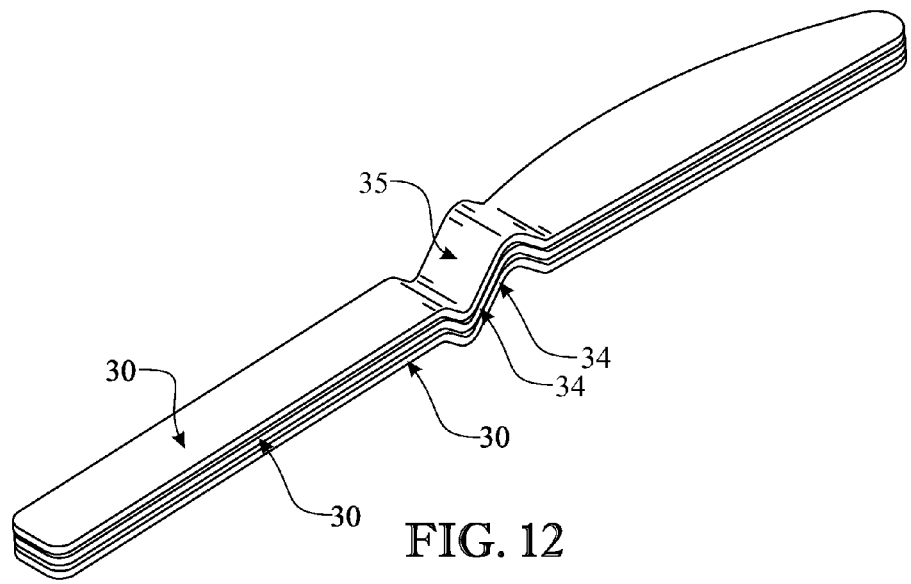
FIG. 12 is a perspective view of the eating utensil of FIG. 9, shown stacked one on top of the other; and finally.

Turning to FIG. 12 there is shown a perspective view of a plurality of knifes 36 stacked one on top of the other, in accordance with the present invention. The knifes 30 are placed one on top of each other such that the lower surface of the handle 32, riser 34 and blade 36 of one knife 30 engage the upper surface of the handle 32, riser 34, and blade 36 of a second knife 30.

Figure 13:
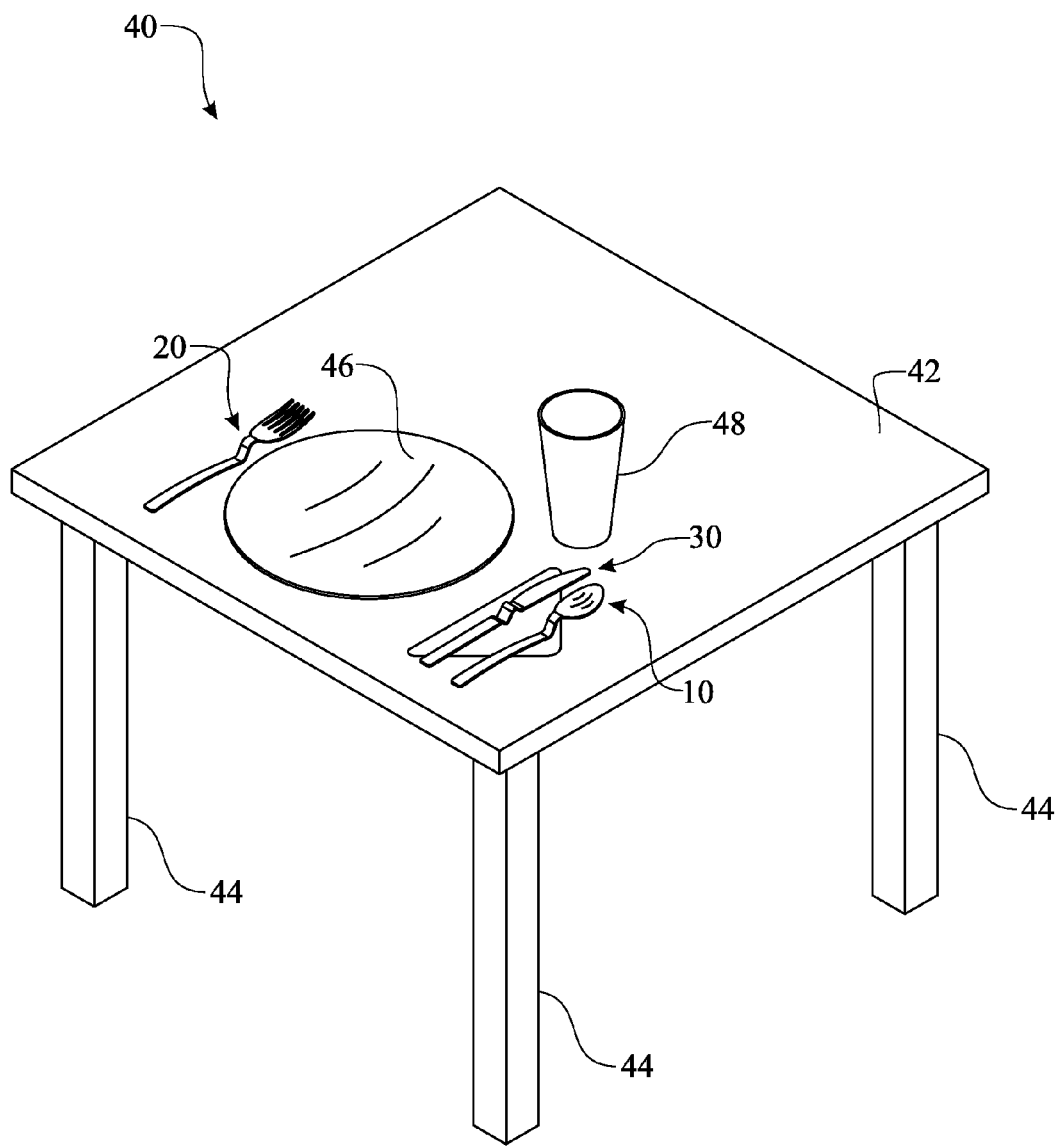
FIG. 13 is a perspective view of a table setting showing placement of the eating utensils of FIGS. 1, 5, and 9, on a table in preparation for eating, in accordance with an embodiment of the present invention.

With reference now made to FIG. 13, there is shown a perspective view of a table setting in accordance with the present invention. In preparation for a meal, it is often the case that a table setting 40 is prepared in advance before the meal is served. The table setting 40 typically includes a table 42 having a planar top supported by a plurality of legs 44. A plate 46 and drinking glass 48 are placed directly on the top of a table 42, or on a placemat disposed on the table 42. Eating utensils 10, 20, 30 are placed adjacent the plate 46. Table setting etiquette typically calls for a fork 20 placed near the left side of the plate 46. Additional forks such as salad forks may also be included. A knife 30 is situated on the right side of the plate 46 with the cutting edge facing the plate 46 and a spoon 10 is placed outside of the knife 30. Dessert spoons, forks, and knifes are often brought in on the dessert plate. A table cloth may be provided as well. As illustrated in FIG. 13, the bowl 16 of spoon 10, the plurality of tines 26 of the fork 20, and the blade 36 of knife 30 are all elevated above the table top to prevent contamination. Upon termination of the meal, the eating utensils 10, 20, 30 are disposed on the surface of table 42 with the working ends 16, 26, 36 elevated to prevent further contamination of table 42.

Handles 12, 22, 32 may include friction-enhancing features such as longitudinal grooves, indentations, ridges, or a plurality of dimples that are disposed or formed on the outer surface to prevent slippage. A cushion or coating may also be disposed on the outer surface of the handle 12, 22, 32 to protect the body or enhance comfort. Preferably, utensils 10, 20, 30 are fabricated from a durable material including plastic, ceramic or metal. In one non-limiting example, utensils 10, 20, 30 are constructed from a rust-resistant material such as stainless steel. It will be understood that eating utensils 10, 20, 30 are preferably constructed as one integral piece eliminating the need for assembly. Eating utensils 10, 20, 30 may be constructed using well-known molding or machining practices including but not limited to injection molding, machine stamping, stamping press, welding, etc. . . . . .

In one exemplary embodiment, eating utensils 10, 20, 30, may include an enlarged handle adapted to provide small children and adults with physical impairments better control during use. Also, eating utensils 10, 20, 30 may include a tether or strap to prevent the device from falling to the floor when released by a user. Aesthetically pleasing patterns, designs and colors may also be implemented if desired.

In one alternative embodiment, eating utensils 10, 20, 30 may also include small protrusions or tabs (not shown) that extend outward from opposite sides of each riser 14, 24, 34 to elevate the bowl 16, tines 26 and blade 36 of the spoon 10, fork 20 and knife 30 above a surface 100 when the spoon 10, fork 20 and knife 30 are placed on their sides.

As shown, the beneficial feature of the present invention allows a user to place the eating utensil 10, 20, 30 in an upright or inverted position on a planar surface 100, to avoid contaminating the bowl 16, plurality of tines 26 or blade 36 of the spoon 10, fork 20, and knife 30, respectively. Thus, whether the eating utensil 10, 20, 30, is situated in an upright position, or an inverted position, the working end 16, 26, 36 of the utensil is consistently elevated from the surface 100 a predetermined distance d to avoid contamination.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. A stackable eating utensil that is placeable on top of a planar surface in a first functional position and a second functional position, the eating utensil comprising:
    a handle;
    a working end;
    a planar elongated riser body extending from said handle and terminating at said working end, the planar elongated riser body extending from said handle at a forward angle tilted towards the working end to space the working end away from the handle in a longitudinal direction of the handle; wherein
    said handle, said riser body and said working end are formed as one integral piece such that a center of gravity of said utensil lies along said handle; wherein
    said riser body comprises a lower, downward curvature end integrally formed with said handle and an upper, upward curvature end integrally formed with said working end; wherein
    said riser body is configured to elevate said working end above the planar surface a first predetermined distance due to a length of the riser body when said utensil is placed in the first functional position on the planar surface and a second predetermined distance when said utensil is placed in the second functional position on said planar surface; wherein
    the riser body is configured to mate with a riser body of another one of the eating utensil such that a riser body of a first one of the eating utensil is matedly stackable on top of a riser body of a second one of the eating utensil while the second one of the eating utensil is adopting either the first functional position or the second functional position; and wherein
    in adopting the first functional position:
        the lower curvature and the handle contact the planar surface and an intermediate portion between the lower curvature and the upper curvature extends upwards from the lower curvature towards the upper curvature and extends away from the planar surface, and
        a first nap is defined between the planar surface and a first curved planar surface of the handle, the first curved planar surface facing the planar surface,
    in adopting the second functional position:
        the upper curvature and the handle contact the planar surface and an intermediate portion between the lower curvature and the upper curvature extends downwards from the lower curvature towards the upper curvature and extends downwards towards the planar surface, and a second gap is defined between the planar surface and a second curved planar surface of the handle, the second curved planar surface being on an opposite side of the handle with respect to the first curved planar surface and facing the planar surface.

2. The eating utensil of claim 1, wherein the length of said riser body defines said first predetermined distance and the upper curvature defines said second predetermined distance in the second functional position, the first predetermined distance being a distance between the planar surface and a lowest point of the working end in the first functional position, and the second predetermined distance being a distance between the planar surface and a highest point of the working end in the second functional position, where the first predetermined distance is greater than the second predetermined distance.

3. The eating utensil of claim 1, wherein said working end includes any one of a bowl forming a spoon, a plurality of tines forming a fork, and a blade forming a knife.

4. The eating utensil of claim 1, wherein said handle defines a curvature along a length thereof extending from one end of said handle to said lower, downward curvature end of said riser body, the curvature causing the first gap to form when the eating utensil adopts the first functional position and causing the second gap to form when the eating utensil adopts the second functional position, the first nap being lesser than the second gap.

5. The eating utensil of claim 1, wherein said upper, upward curvature end of said riser body is configured to elevate said working end above said planar surface when said utensil is placed in the second functional position on said planar surface.

6. The eating utensil of claim 1, wherein said handle, said riser body, and said working end are constructed from any one of plastic, ceramic, wood, or metal.

7. Stackable flatware for manipulating food and liquid, the flatware placeable on top of a flat surface in a first, upright, functional position and a second, inverted, functional position, said flatware comprising:
an elongated body forming:
a handle,
a planar riser body, and
a distal operating end,
said planar riser body extending from said handle and terminating at said distal operating end, the planar riser body extending from said handle at a forward angle tilted towards the distal operating end to space the distal operating end away from the handle in a longitudinal direction of the handle such that a center of gravity of said flatware lies along said handle; wherein
said planar riser body comprises a lower, downward curvature end integrally formed with said handle and an upper, upward curvature end integrally formed with said distal operating end; wherein
said riser body is configured to elevate said distal operating end above the flat surface a first predetermined distance due to a length of the riser body when said flatware is placed in the first functional position on the flat surface and a second predetermined distance when said flatware is placed in the second functional position on said flat surface; and wherein
the riser body is configured to mate with a riser body of another one of the flatware such that a riser body of a first one of the flatware is matedly stackable on top of a riser body of a second one of the flatware while the second one of the flatware is adopting either of the first functional position and the second functional position; and wherein
in adopting the first functional position:
the lower curvature and the handle contact the flat surface and an intermediate portion between the lower curvature and the upper curvature extends upwards from the lower curvature towards the upper curvature and extends away from the flat surface, and
a first gap is defined between the flat surface and a first curved planar surface of the handle, the first curved planar surface facing the flat surface,
in adopting the second functional position:
the upper curvature and the handle contact the flat surface and an intermediate portion between the lower curvature and the upper curvature extends downwards from the lower curvature towards the upper curvature and extends downwards towards the flat surface, and
a second gap is defined between the flat surface and a second curved planar surface of the handle, the second curved planar surface being on an opposite side of the handle with respect to the first curved planar surface and facing the flat surface.

8. The flatware of claim 7, wherein the length of said riser body defines said first predetermined distance and the upper curvature defines said second predetermined distance when the upper curvature contacts the flat surface in the second functional position, the first predetermined distance being a distance between the flat surface and a lowest point of the distal operating end in the first functional position and the second predetermined distance being a distance between the flat surface and a highest point of the distal operating end in the second functional position, where the first predetermined distance is greater than the second predetermined distance.

9. The flatware of claim 7, wherein said distal operating end includes any one of a bowl forming a spoon, a plurality of tines forming a fork, and a blade forming a knife.

10. The flatware of claim 7, wherein said handle defines a curvature along a length thereof extending from one end of said handle to said lower, downward curvature end of said riser body, the curvature causing the first gap to form when the flatware adopts the first functional position and causing the second gap to form when the flatware adopts the second functional position, the first gap being lesser than the second gap.

11. The flatware of claim 7, wherein said upper, upward curvature end of said riser body is configured to elevate said distal operating end above said flat surface when said flatware is placed in the second functional position on said flat surface.

12. The flatware of claim 7, wherein said handle, said riser body, and said distal operating end are constructed from any one of plastic, ceramic, wood, or metal.

13. The flatware of claim 7, wherein said riser body comprises an S-shape configuration.

14. A stackable eating utensil that is placeable on top of a planar surface in a first functional position and a second functional position, the eating utensil comprising:
a handle comprising a proximal end and a distal end, wherein a center of gravity of said eating utensil lies along the handle;
a planar riser portion extending from said distal end of said handle, the riser portion comprising a downwardly curved section including an upward concave surface and a downward convex surface, an upwardly curved section including an upward convex surface and a downward concave surface, and a riser section between the downwardly curved section and the upwardly curved section; and a working end extending from said riser portion such that the riser section extends from said handle and terminates at said working end, the riser section extending from said handle at a forward angle tilted towards the working end to space the working end away from the handle in a longitudinal direction of the handle; wherein said riser portion is configured to elevate said working end above the planar surface a first predetermined distance due to a length of the riser portion when said eating utensil is placed in the first functional position on the planar surface and a second predetermined distance when said utensil is placed in the second functional position on said planar surface; wherein the riser portion is configured to mate with a riser portion of another one of the eating utensil such that a riser portion of a first one of the eating utensil is matedly stackable on top of a riser portion of a second one of the eating utensil while second one of the eating utensil is adopting either the first functional position or the second functional position; wherein the downward convex surface and the downward concave surface of the first one of the eating utensil is configured to mate with an upward concave surface and an upward convex surface of the second one of the eating utensil, respectively when the first one of the eating utensil is stacked on top of the second one of the eating utensil while the second one of the eating utensil is adopting the first functional position; wherein the upward concave surface and the upward convex surface of the first one of the eating utensil is configured to mate with the downward convex surface and the downward concave surface of the second one of the eating utensil, respectively when the second one of the eating utensil is adopting the second functional position; wherein a bottom planar surface of a riser section of the first one of the eating utensil is configured to mate with a top planar surface of a riser section of the second one of the eating utensil while the second one of the eating utensil is adopting the first functional position; and wherein in adopting the first functional position:

the downwardly curved section and the handle contact the planar surface and the riser section extends upwards from the downwardly curved section towards the upwardly curved section and extends away from the planar surface, and a first gap is defined between the planar surface and a first curved planar surface of the handle the first curved planar surface facing the planar surface, in adopting the second functional position:

the upwardly curved section and the handle contact the planar surface and the riser section extends downwards from the downwardly curved section towards the upwardly curved section and extends downwards towards the planar surface, and a second gap is defined between the planar surface and a second curved planar surface of the handle, the second curved planar surface being on an opposite side of the handle with respect to the first curved planar surface and facing the planar surface.

15. The eating utensil of claim 14, wherein said working end includes any one of a bowl forming a spoon, a plurality of tines forming a fork, and a blade forming a knife.

16. The eating utensil of claim 14, wherein said handle defines a curvature along a length thereof extending from said proximal end of said handle to said downwardly curved portion of said riser portion, the curvature causing the first gap to form when the eating utensil adopts the first functional position and causing the second nap to form when the eating utensil adopts its the second functional position, the first gap being lesser than the second gap.

17. The eating utensil of claim 14, wherein said handle, said riser portion, and said working end are constructed from any one of plastic, ceramic, wood, or metal.

18. The eating utensil of claim 14, wherein the riser portion is S-shaped.

* * * * *